(12) United States Patent
Kimura

(10) Patent No.: US 8,279,720 B2
(45) Date of Patent: Oct. 2, 2012

(54) HARD DISK APPARATUS AND DRIVING METHOD THEREFOR

(75) Inventor: Motoi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 265 days.

(21) Appl. No.: 12/805,187

(22) Filed: Jul. 16, 2010

(65) Prior Publication Data
US 2011/0075525 A1    Mar. 31, 2011

(30) Foreign Application Priority Data
Sep. 29, 2009   (JP) ................................ 2009-224473

(51) Int. Cl.
*G11B 11/00* (2006.01)
(52) U.S. Cl. .................................................. 369/13.26
(58) Field of Classification Search ............... 369/13.24, 369/30.03, 59.12, 116, 59.11, 13.26, 13.25, 369/13.27, 13.17, 13.32
See application file for complete search history.

(56) References Cited

U.S. PATENT DOCUMENTS
6,426,929 B1 *   7/2002   Watabe et al. ............. 369/59.12

FOREIGN PATENT DOCUMENTS
JP           3932840        3/2007

* cited by examiner

*Primary Examiner* — Ali Neyzari
(74) *Attorney, Agent, or Firm* — Rader Fishman & Grauer, PLLC

(57) ABSTRACT

Disclosed herein is a hard disk apparatus, including: a magnetic recording medium; a recording head adapted to record information on the magnetic recording medium; a semiconductor laser adapted to be controlled for light emission in a cycle of a recording clock to irradiate a light spot upon the magnetic recording medium to carry out thermal assistance in magnetic recording by the recording head; a laser driving circuit adapted to drive the semiconductor laser at a timing and with optical power in accordance with a light emission timing signal and a laser power controlling signal; and a controller adapted to set laser power in accordance with at least one of characteristics of the magnetic recording medium, semiconductor laser and recording head and output the laser power controlling signal to the laser driving circuit so that the laser power is adaptively varied.

11 Claims, 10 Drawing Sheets

FIG. 3
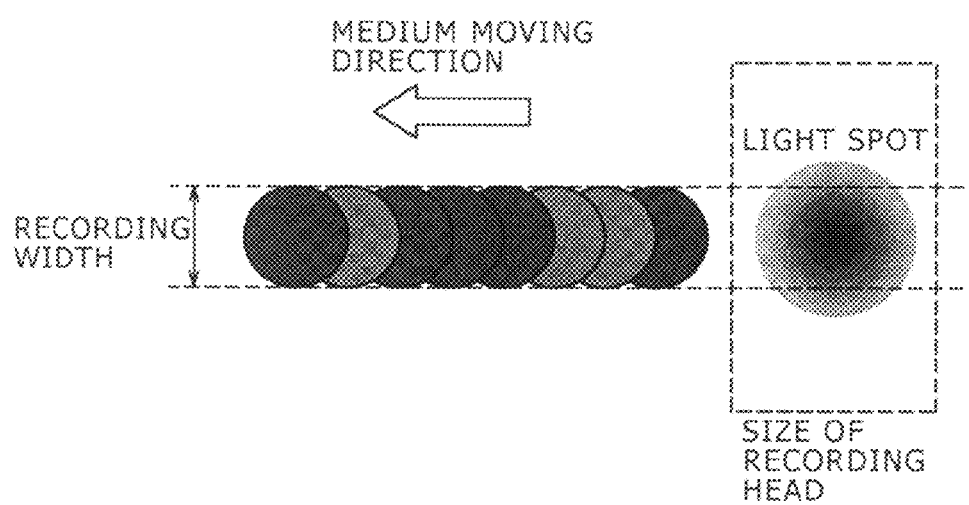
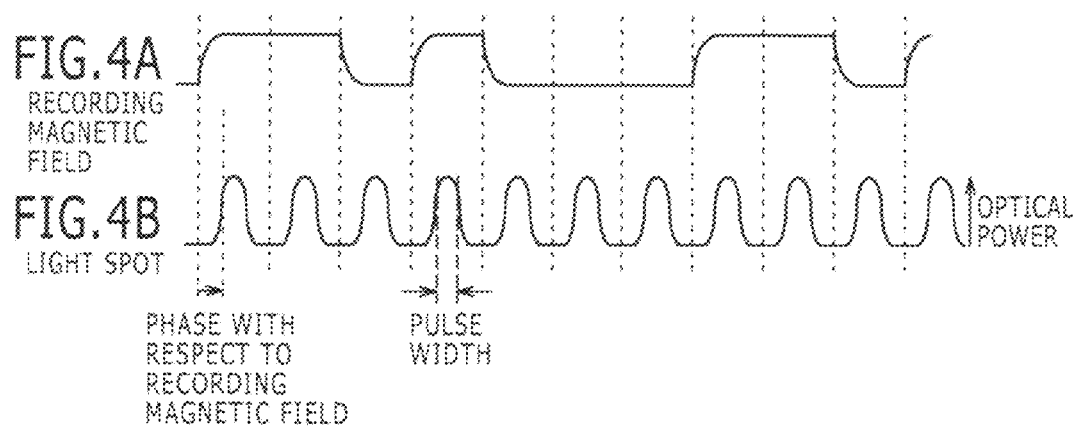

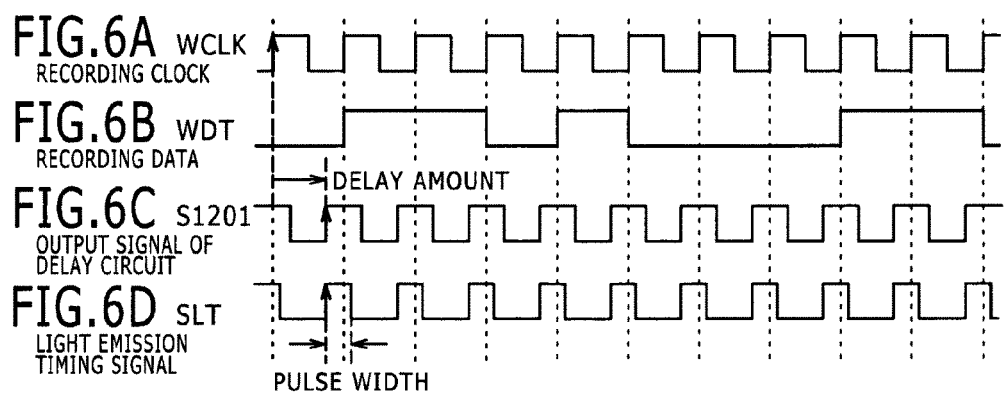
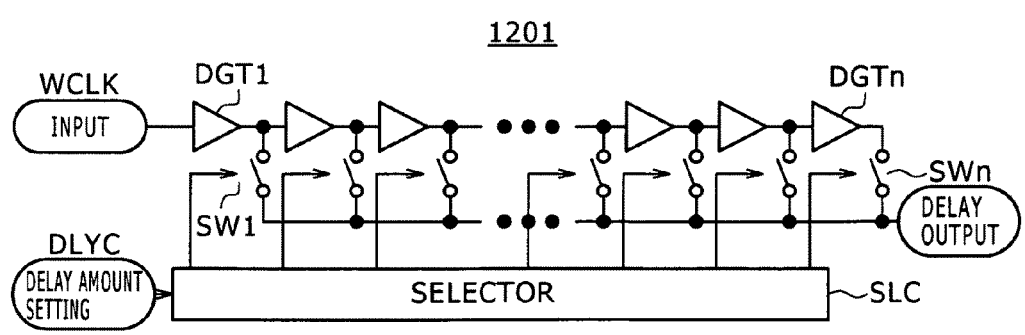
FIG. 7

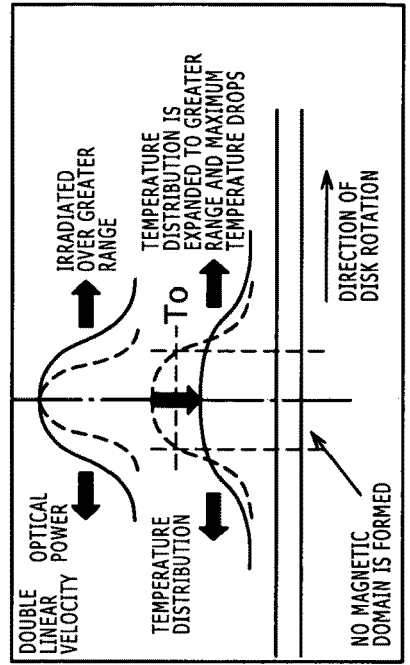
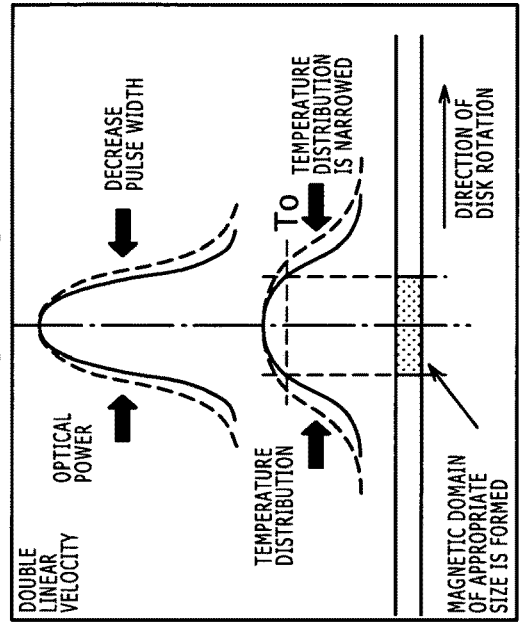
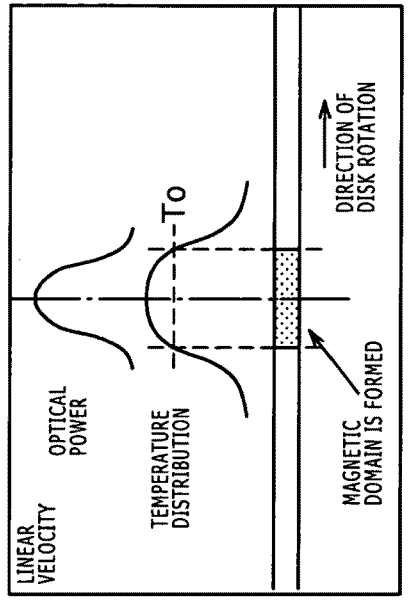
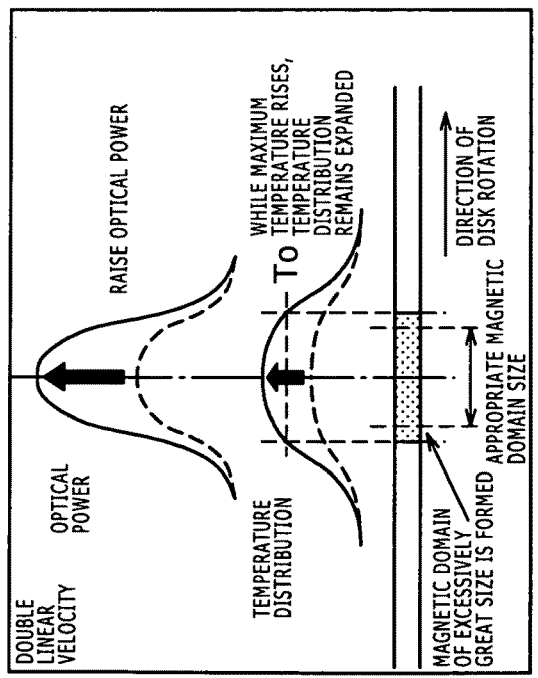

HARD DISK APPARATUS AND DRIVING METHOD THEREFOR

BACKGROUND OF THE INVENTION

1. Field of the Invention

This invention relates to a hard disk apparatus including a semiconductor laser as a light source for carrying out thermally assisted magnetic recording and a driving method for the hard disk apparatus.

2. Description of the Related Art

FIG. 1 shows an example of a configuration of a hard disk apparatus.

Referring to FIG. 1, the hard disk apparatus 1 is roughly divided into four sections including a head disk assembly 2, a signal processing circuit 3, a motor driver 4 and a system controller 5 in the form of a microcomputer for controlling the overall system.

The head disk assembly 2 includes a magnetic disk 21 for storing information, a spindle motor 22 for rotating the magnetic disk 21, a recording head 23 and a reproduction head 24 for carrying out recording and reproduction of information on and from the magnetic disk 21, respectively, a read/write amplifier 25 and so forth.

The head disk assembly 2 is configured by integrating the mechanism parts described, a voice coil motor 26 and so forth.

The recording head 23 and the reproduction head 24 are mounted at a tip end of a carriage for movement in a radius direction on the magnetic disk 21. The carriage is driven by the voice coil motor 26.

A write amplifier 25W for driving the recording head 23 and a read amplifier 25R for amplifying a signal from the reproduction head 24 are formed from one IC normally as the read/write amplifier 25.

In order to cope with increase of the transmission rate in recent years, also the read/write amplifier 25 is mounted on the carriage in order that the wiring line length to the recording head 23 and reproduction head 24 may be minimized.

The signal processing circuit 3 includes a modulation circuit 31, a recording compensation circuit 32, a read channel circuit 33, a servo data detection circuit 34, an ECC encoding scramble circuit 35, an ECC decoding descramble circuit 36 and a host apparatus interface (I/F) 37.

The signal processing circuit 3 further includes an SDRAM 38 and a recording clock section 39.

The signal processing circuit 3 produces recording data from user data sent thereto from a host apparatus, and reproduces user data from a reproduction signal and transmits the reproduced data to the host apparatus.

The signal processing circuit 3 carries out processes such as addition of an ECC code, encoding and scrambling for user data sent thereto from the host apparatus. The modulation circuit 31 produces recording data synchronized with a recording clock and transmits the produced data to the write amplifier 25W.

The write amplifier 25W drives a magnetic field head with recording current designated by the system controller 5 in accordance with the recording data to generate a modulation magnetic field.

In high-density recording in recent years, a phenomenon appears that a flux reversal position is displaced by an influence of magnetic domains generated adjacent to each other, and a technique for compensating for the displacement by the recording compensation circuit 32 is used.

The read channel circuit 33 carries out signal processes based on the PRML (Partial Response Maximum Likelihood) method such as waveform equalization, Viterbi decoding and demodulation for the reproduction signal sent thereto from the read amplifier 25R.

The signal is further subjected to such processes as descrambling, decoding and error correction to produce user data.

While only a servo signal processing section is shown in FIG. 1, the system controller 5 controls the entire system in accordance with an operation command designated from the host apparatus.

Servo data detected from within the reproduction signal is transmitted to the servo signal processing section 51 to control the voice coil motor 26 and the spindle motor 22.

The motor driver 4 drives the voice coil motor 26 and the spindle motor 22 in accordance with instructions from the servo signal processing section 51.

[Zone Bit Recording]

Now, zone bit recording is described.

In the hard disk apparatus 1, the magnetic disk 21 is rotating at a constant speed of rotation.

Since the linear velocity, that is, the relative speed between the head and the medium, increases toward the outer periphery of the magnetic disk 21, if recording is carried out with a constant channel clock frequency, then the linear density decreases toward the outer periphery.

Therefore, as shown in FIG. 2A, one disk is divided into a plurality of zones in which channel clock frequencies are different from each other.

Then, the channel clock frequency is increased toward a zone on the outer periphery side as seen in FIG. 2B to avoid drop of the linear density and increase the information amount which can be stored on one disk.

While the channel clock frequency is constant in one zone, the linear velocity and the linear density gradually vary depending upon the radius.

[Thermally Assisted Magnetic Recording]

Now, thermally assisted magnetic recording is described.

The risk for data loss by a thermal fluctuation increases together with increase of the recording density, and thermally assisted magnetic recording is proposed as a countermeasure against the risk (for example, refer to Japanese Patent No. 3932840).

The thermally assisted magnetic recording is a method wherein a medium having high coercive force is used to avoid the problem of the thermal fluctuation.

The high coercive force medium cannot be recorded by a popular recording head.

If a very small light spot is irradiated to increase the medium temperature, then the coercive force can be decreased and recording can be carried out by a recording head similar to that of an existing technique.

A small semiconductor laser whose emergent light is uniform in wavelength and phase is suitable as a light source for producing a very small light spot.

FIG. 3 illustrates a manner of a medium in thermally assisted magnetic recording.

An exiting recording method has a problem that, if the recording head is reduced in size in order to increase the recording density, then a magnetic field which can be generated thereby becomes so small that a magnetic field necessary for recording cannot be obtained.

In this method, by forming a very small light spot, a magnetic domain smaller than the recording head corresponding to the light spot can be formed and the recording density can be increased in both of a linear direction and a track direction.

FIGS. 4A and 4B show a recording magnetic field and an optical waveform in the thermally assisted magnetic recording, respectively.

The recording magnetic field shown in FIG. 4A is an alternating field in accordance with recording data similarly as in normal magnetic recording.

On the other hand, a light spot shown in FIG. 4B is intermittently irradiated in a cycle of a channel clock.

A magnetic domain in accordance with the recording magnetic field is formed in a region in which the medium temperature is increased and the coercive force is decreased by the light spot.

The waveform of the light spot determines not only a temperature distribution of the medium but also the shape of a magnetic domain to be formed.

Accordingly, in order to implement high-density recording, not only the phase of the light waveform with respect to the recording magnetic field but also the pulse width and the light power with respect to the recording magnetic field must be suitably controlled.

SUMMARY OF THE INVENTION

Incidentally, since the speed of rotation of a magnetic disk in a hard disk apparatus is constant, the linear velocity varies depending upon the radius. Further, in the zone bit recording, the channel clock frequency is made different among different zones.

As a result, toward the outer periphery, the linear velocity increases and the channel clock frequency increases.

In the thermally assisted magnetic recording wherein a light spot scans on the disk, the temperature distribution of the medium is varied by variation of the linear velocity and the channel clock frequency.

Accordingly, a mechanism for varying the phase, pulse width and optical power with respect to the recording magnetic field of a light spot in response to the linear velocity and the channel clock frequency is required.

Therefore, it is desirable to provide a hard disk apparatus and a driving method therefor wherein a good recording characteristic can be obtained also under variation of the linear velocity and the channel clock frequency.

According to an embodiment of the present invention, there is provided a hard disk apparatus, including a magnetic recording medium, a recording head adapted to record information on the magnetic recording medium, a semiconductor laser adapted to be controlled for light emission in a cycle of a recording clock to irradiate a light spot upon the magnetic recording medium to carry out thermal assistance in magnetic recording by the recording head. The hard disk apparatus further includes a laser driving circuit adapted to drive the semiconductor laser at a timing and with optical power in accordance with a light emission timing signal and a laser power controlling signal, and a controller adapted to set laser power in accordance with at least one of characteristics of the magnetic recording medium, semiconductor laser and recording head and output the laser power controlling signal to the laser driving circuit so that the laser power is adaptively varied in accordance with at least one of a linear velocity and a channel clock frequency.

According to another embodiment of the present invention, there is provided a driving method for a hard disk apparatus which includes a magnetic recording medium, a recording head adapted to record information on the magnetic recording medium, a semiconductor laser adapted to be controlled for light emission in a cycle of a recording clock to irradiate a light spot upon the magnetic recording medium to carry out thermal assistance in magnetic recording by the recording head, and a laser driving circuit adapted to drive the semiconductor laser at a timing and with optical power in accordance with a light emission timing signal and a laser power controlling signal. The driving method includes the step of setting, when the semiconductor laser of the hard disk apparatus is driven, laser power in accordance with at least one of characteristics of the magnetic recording medium, semiconductor laser and recording head and adaptively varying the laser power in accordance with at least one of a linear velocity and a channel clock frequency.

With the hard disk apparatus and the driving method therefor, a good recording characteristic can be obtained also under variation of the linear velocity and the channel clock frequency.

BRIEF DESCRIPTION OF THE DRAWINGS

FIG. 3 is a schematic view illustrating a manner of a medium in thermally assisted magnetic recording;

FIGS. 4A and 4B are timing charts illustrating a recording magnetic field and a light waveform in the thermally assisted magnetic recording, respectively;

FIGS. 6A to 6D are timing charts illustrating an example of generation of a light emission timing signal in the thermally assisted hard disk apparatus of FIG. 5;

FIG. 7 is a circuit diagram showing a configuration of a variable delay circuit in the thermally assisted hard disk apparatus of FIG. 5;

FIGS. 10A to 10D are diagrams illustrating laser driving current control with respect to a linear velocity variation in the thermally assisted hard disk apparatus of FIG. 5;

DETAILED DESCRIPTION OF THE PREFERRED EMBODIMENT

In the following, an embodiment of the present invention is described with reference to the drawings.

It is to be noted that description is given in the following order.
1. Example of General Configuration of Hard Disk Apparatus
2. Particular Configuration and Operation of Driving System of Semiconductor Laser
3. Control with respect to Linear Velocity Variation <1. Example of General Configuration of Hard Disk Apparatus>

Figure 1:
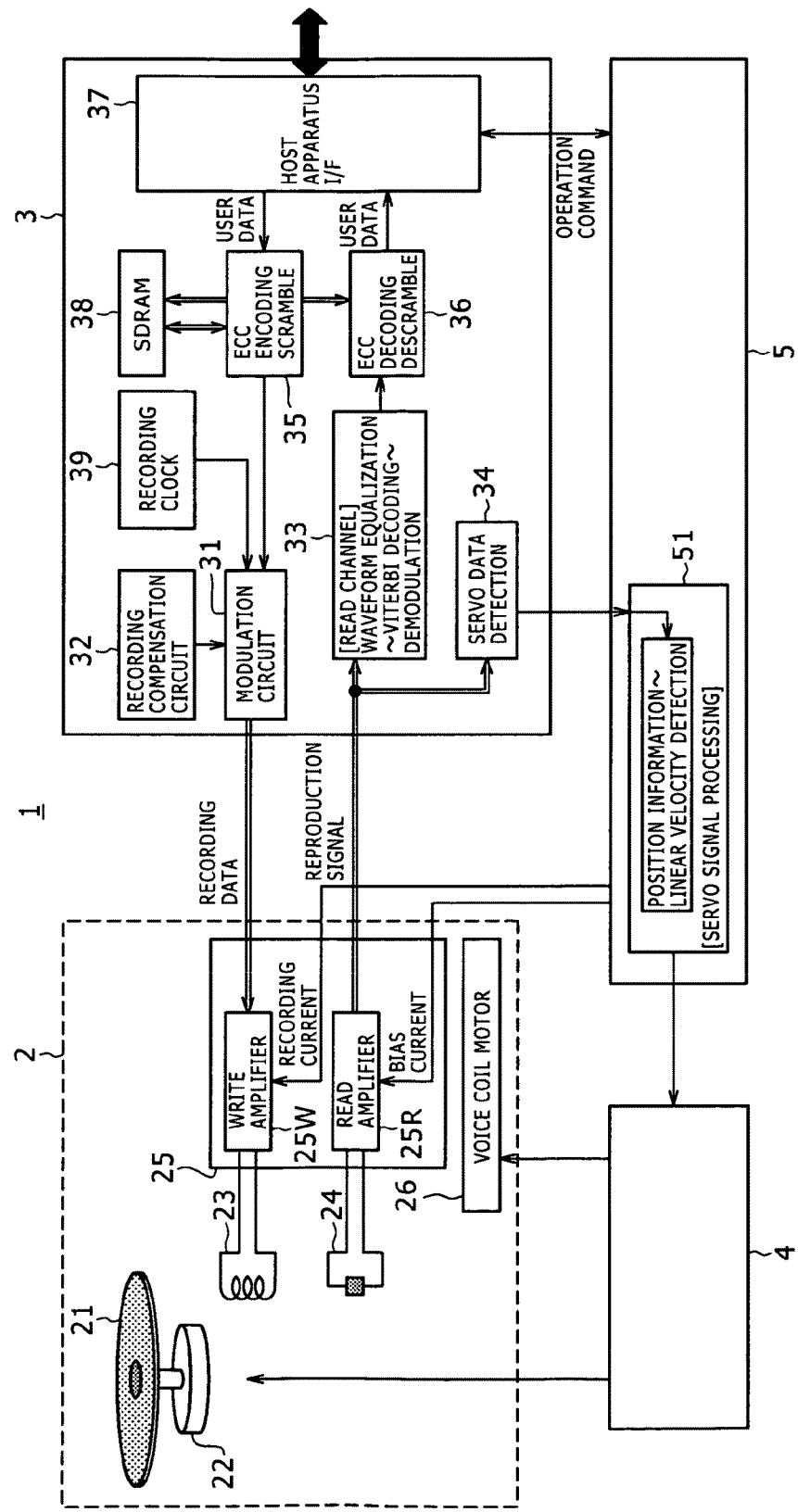
FIG. 1 is a block diagram showing an example of a configuration of a hard disk apparatus.
Figure 2A:
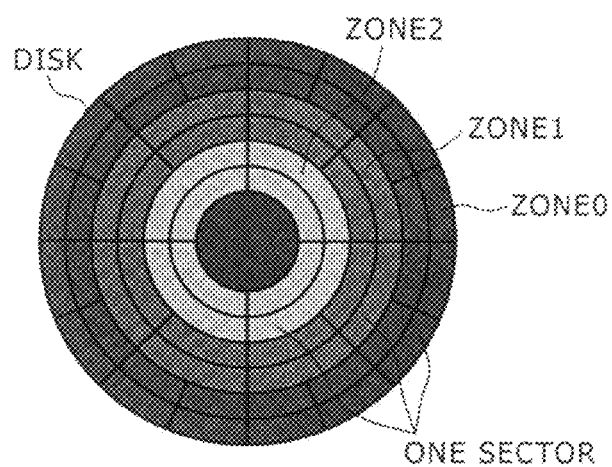
FIGS. 2A and 2B are diagrammatic views illustrating zone bit recording.
Figure 2B:
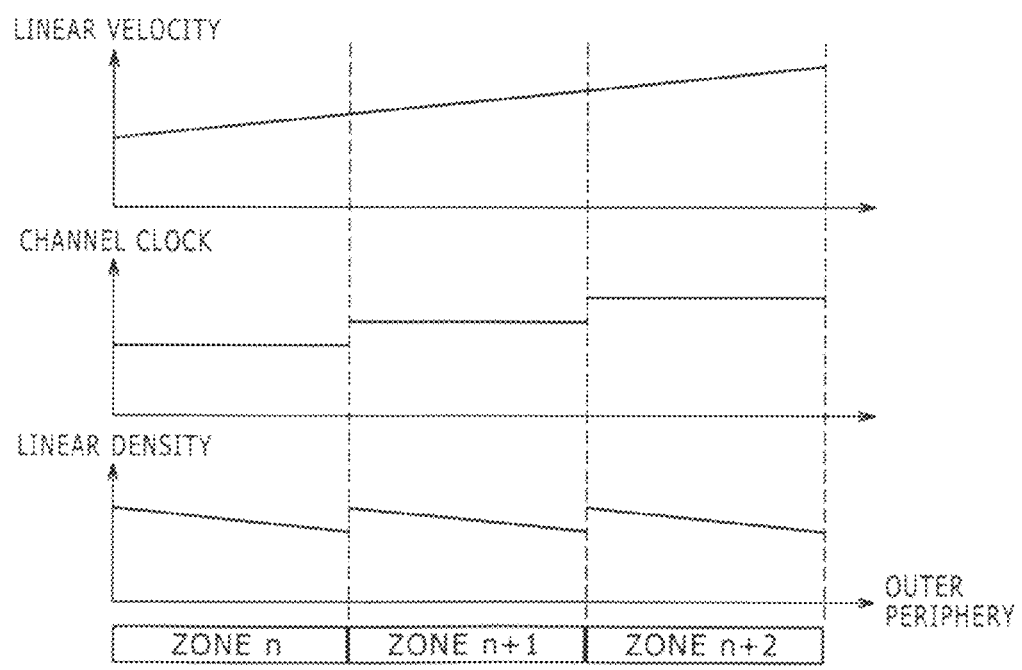
Figure 5:
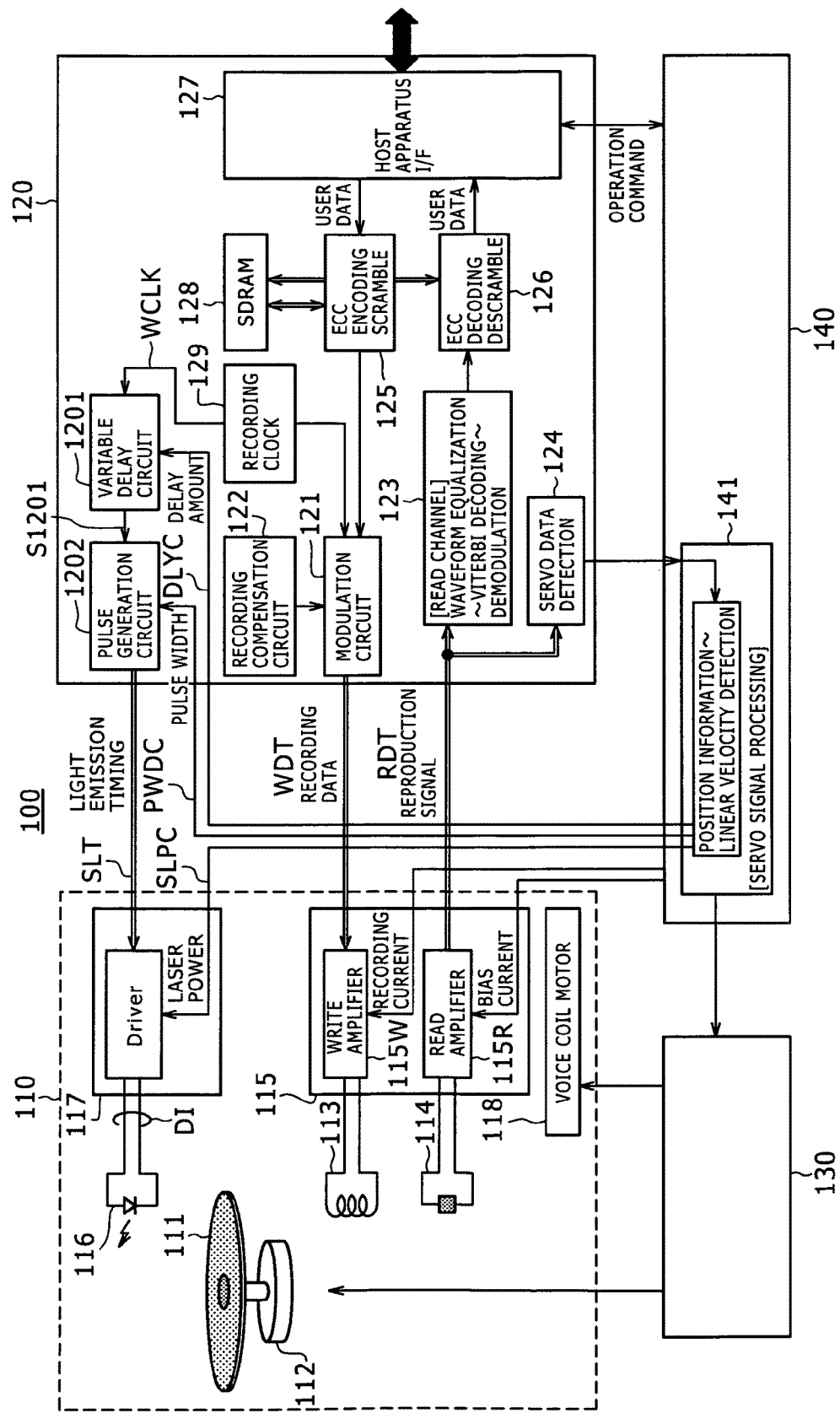
FIG. 5 is a block diagram showing an example of a configuration of a thermally assisted hard disk apparatus according to an embodiment of the present invention.

FIG. 5 shows an example of a configuration of a thermal assisted hard disk apparatus according to the embodiment of the present invention.

Referring to FIG. 5, the present hard disk apparatus 100 includes a head disk assembly 110, a signal processing circuit 120, a motor driver 130 and a system controller 140 in the form of a microcomputer for controlling the entire system.

The head disk assembly 110 includes a magnetic disk 111 for storing information, a spindle motor 112 for rotating the magnetic disk 111, a recording head 113 and a reproduction head 114 for carrying out recording and reproduction of information on and from the magnetic disk 111, respectively, and a read/write amplifier 115.

The head disk assembly 110 further includes a semiconductor laser 116 and a laser driving circuit 117 for thermally assisted magnetic recording and further includes a voice coil motor 118 and so forth.

The thermal assisted hard disk apparatus 110 causes the semiconductor laser 116 to emit light in a recording clock cycle to carry out thermally assisted magnetic recording.

The laser driving circuit 117 drives the semiconductor laser 116 at a timing in accordance with a light emission timing signal SLT from the signal processing circuit 120 and with power in accordance with a laser power controlling signal SLP from the system controller 140.

The driving system of the semiconductor laser 116 is hereinafter described in detail together with the signal processing circuit 120.

In the head disk assembly 110, the recording head 113 and the reproduction head 114 are mounted at a tip end of a carriage for movement on the magnetic disk 111 in a radial direction, and the carriage is driven by the voice coil motor 118.

A write amplifier 115W for driving the recording head 113 and a read amplifier 115R for amplifying a signal from the reproduction head 114 are formed normally as the read/write amplifier 115 from one IC (Integrated Circuit).

In order to be ready for increase of the transmission rate in recent years, also the read/write amplifier 115 is mounted on the carriage in order that the wiring line length of the recording head 113 and the reproduction head 114 is reduced.

The signal processing circuit 120 includes a modulation circuit 121, a recording compensation circuit 122, a read channel circuit 123, a servo data detection circuit 124, an ECC encoding scramble circuit 125, an ECC decoding descramble circuit 126 and a host apparatus interface (I/F) 127.

The signal processing circuit 120 further includes an SDRAM 128 and a recording clock section 129.

Furthermore, the signal processing circuit 120 includes a variable delay circuit 1201 and a pulse generation circuit 1202.

The variable delay circuit 1201 applies adjustable delay to a recording clock and outputs the resulting recording clock as a delay output signal S1201 to the pulse generation circuit 1202.

The variable delay circuit 1201 absorbs a delay difference to the recording head and the semiconductor laser 116 from the recording clock to adjust the light emission timing with respect to the recording magnetic field, and adaptively varies the light emission timing of the semiconductor laser 116 in response to the linear velocity and the channel clock frequency.

The pulse generation circuit 1202 generates a pulse train having an adjustable width synchronized with the recording clock and outputs the pulse train to the laser driving circuit 117.

The pulse generation circuit 1202 sets a pulse width in response to characteristics of the medium, the semiconductor laser 116, the recording head 113 and so forth, and adaptively varies the light emission pulse width in response to the linear velocity and the channel clock frequency.

In the present embodiment, the laser driving circuit 117 and the semiconductor laser 116 can be adaptively driven in accordance with the instructions from the variable delay circuit 1201 and the pulse generation circuit 1202.

With the configuration just described, a phase, a pulse width and light power of a light spot with respect to the recording magnetic field not only can be suitably set in response to the characteristics of the medium, the semiconductor laser, the recording head and so forth but also can be adaptively varied in response to the linear velocity and the channel clock frequency.

Consequently, the hard disk apparatus 100 according to the present embodiment can implement high-density recording over the overall face of the disk.

The signal processing circuit 120 produces recording data from user data transmitted thereto from the host apparatus, and reproduces user data from a reproduction signal and then transmits the reproduced data to the host apparatus.

The signal processing circuit 120 carries out such processes as addition, encoding, scramble and so forth of an ECC code for the user data transmitted thereto from the host apparatus, and the modulation circuit 121 produces and transmits recording data synchronized with the recording clock to the write amplifier 115W.

The write amplifier 115W drives the magnetic field head with recording current designated by the system controller 140 in accordance with the recording data to generate a modulation magnetic field.

In high-density recording in recent years, a phenomenon that a flux reversal position is displaced by an influence of magnetic domains generated in the proximity of each other occurs, and a technique is used wherein the displacement is compensated for in advance by the recording compensation circuit 122.

The read channel circuit 123 carries out such signal processes as waveform equalization, Viterbi decoding, demodulation and so forth based on the PRML for the reproduction signal transmitted thereto from the read amplifier 115R.

Further, user data is produced through processes such as descramble, decoding, error correction and so forth for the reproduction signal after the signal processes.

While only the servo signal processing section 141 of the system controller 140 is shown in FIG. 5, the system controller 140 carries out control of the entire system in accordance with an operation command received from the host apparatus.

Servo data detected from within the reproduction signal is transmitted to the servo signal processing section 141 and used to control the voice coil motor 118, the spindle motor 112 and so forth.

The servo signal processing section 141 applies delay amount DLY information for adjustment to the variable delay circuit 1201 of the signal processing circuit 120.

The servo signal processing section 141 applies pulse width PWD information for adjustment to the pulse generation circuit 1202 of the signal processing circuit 120.

The servo signal processing section 141 supplies a laser power signal SLPS to the head disk assembly 110.

The motor driver 130 drives the voice coil motor 118 and the spindle motor 112 in accordance with an instruction from the servo signal processing section 141.

A particular configuration and operation principally of the laser driving circuit 117, variable delay circuit 1201 and pulse generation circuit 1202 for adaptively driving the semiconductor laser 116 serving as a light source which is a characteristic configuration of the present embodiment are described below.

<2. Particular Configuration and Operation of Driving System of Semiconductor Laser>

Operation of the circuit described above is described below together with an example of generation of a light emission timing signal with reference to FIGS. 6A to 6D.

FIGS. 6A, 6B, 6C and 6D illustrate a recording clock WCLK, recording data WDT, the output signal S1201 of the variable delay circuit 1201 and the light emission timing signal SLT, respectively.

User data sent from the host apparatus is subjected to such processes as ECC, encoding and scrambling by the ECC encoding scramble circuit 125 and then is used by the modulation circuit 121 to produce recording data WDT of FIG. 6B synchronized with the recording clock WCLK illustrated in FIG. 6A.

The recording head 113 is driven in accordance with the recording data WDT and produces such a recording magnetic field as illustrated in FIG. 6A.

Here, operation for compensating for the displacement of the magnetization reversing position by the recording compensation circuit 122 is omitted.

Further, the servo signal processing section 141 of the system controller 140 can determine, from address information included in the servo data, the channel clock frequency and the linear velocity at the place.

Based on the information, the servo signal processing section 141 not only controls the speed of rotation of the spindle motor and the recording clock frequency but also produces a laser power controlling signal SLPC, a pulse width controlling signal PWDC and a delay amount controlling signal DLYC necessary for the control hereinafter described.

Meanwhile, the recording clock WCLK illustrated in FIG. 6A is supplied to the variable delay circuit 1201 toward the laser driving circuit 117.

The variable delay circuit 1201 delays the recording clock WCLK as seen in FIG. 6C in accordance with the delay amount controlling signal DLYC supplied thereto from the servo signal processing section 141.

[Example of Configuration of Variable Delay Circuit]

Here, an example of a configuration of the variable delay circuit 1201 is described.

FIG. 7 shows an example of a configuration of the variable delay circuit according to the present embodiment.

In the present example, a plurality of delay gates or buffers DGT1 to DGTn are connected in cascade connection, and switches SW1 to SWn for tap connection are provided between connection nodes for each stages and the delay output terminal.

A selector SLC switches on one of the switches SW (SW1 to SWn) in response to information of the delay amount controlling signal DLYC supplied thereto from the servo signal processing section 141.

Consequently, the recording clock WCLK which is an input signal is delayed by time corresponding to the delay amount controlling signal DLYC and outputted as a delay output signal S1201.

The pulse generation circuit 1202 synchronizes the output signal S1201 delayed by the variable delay circuit 1201 with the input clock to generate a pulse signal having a width equal to or greater than 0 but less than the channel clock period in response to the pulse width controlling signal PWDC.

The pulse generation circuit 1202 outputs the generated pulse signal as a light emission timing signal SLT to the laser driving circuit 117.

[Example of Configuration of Pulse Generation Circuit]

Here, an example of a configuration of the pulse generation circuit 1202 is described.

Figure 8:
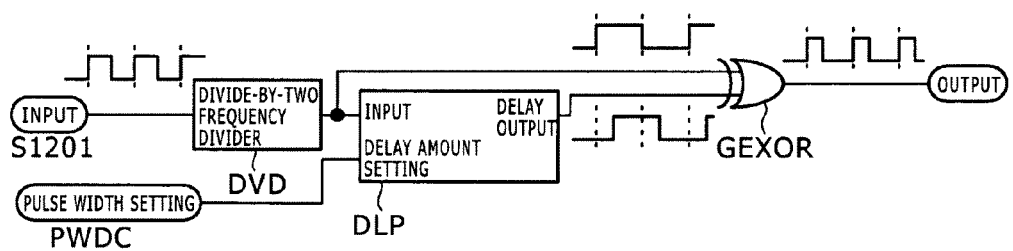
FIG. 8 is a diagrammatic view showing an example of a configuration of a pulse generation circuit in the thermally assisted hard disk apparatus of FIG. 5.

FIG. 8 shows an example of a configuration of the pulse generation circuit according to the present embodiment.

Referring to FIG. 8, the pulse generation circuit 1202 shown includes a divide-by-two frequency divider DVD, a delay section DLP and an exclusive OR gate GEXOR.

The pulse generation circuit 1202 divides the frequency of the input clock by two by means of the divide-by-two frequency divider DVD and employs exclusively ORs the resulting division signal and a signal obtained by delaying the division signal by means such a delay circuit as described hereinabove with reference to FIG. 7.

Consequently, the pulse generation circuit 1202 can generate a pulse signal synchronized with the input clock and having a width equal to or greater than 0 but less than the channel clock period.

By the configuration described, a pulse train synchronized with the delayed recording clock and having a width designated by the pulse width controlling signal PWDC as seen in FIG. 6D can be produced.

The pulse train is sent as a light emission timing signal SLT to the laser driving circuit 117.

The laser driving circuit 117 supplies laser driving current DI designated by the laser power controlling signal SLPC to the semiconductor laser 116 at a timing in accordance with the inputted light emission timing signal SLT.

[Example of Configuration of Laser Driving Circuit]

Here, an example of a configuration of the laser driving circuit 117 is described.

Figure 9:
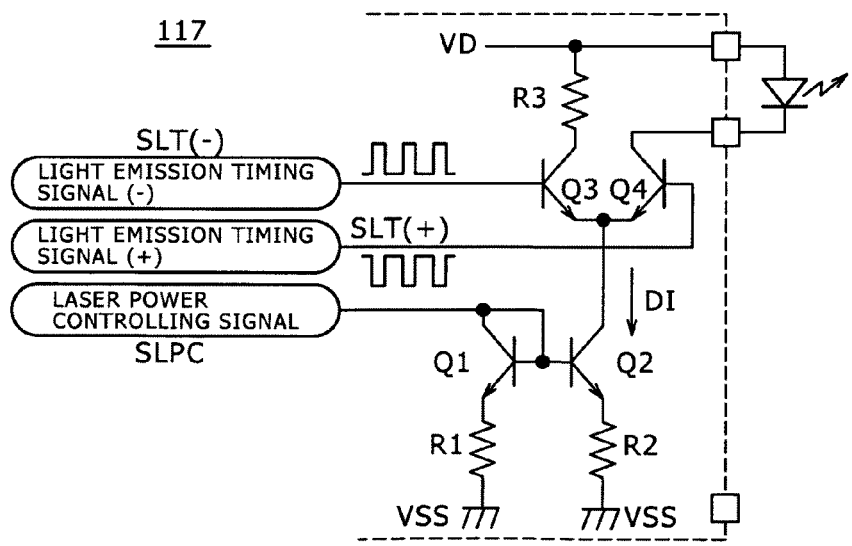
FIG. 9 is a circuit diagram showing an example of a configuration of a laser driving circuit in the thermally assisted hard disk apparatus of FIG. 5.

FIG. 9 shows an example of a configuration of the laser driving circuit in the present embodiment.

Referring to FIG. 9, the laser driving circuit 117 shown includes npn transistors Q1 to Q4 and resistance elements R1 to R4.

In the laser driving circuit 117, a current mirror circuit is formed from the transistors Q1 and Q2, and the transistor Q2 generates constant current in accordance with the laser power controlling signal SLPC.

The transistors Q3 and Q4 carry out differential switching such that they are alternately switched on and off in response to light emission timing signals SLT(+)/SLT(−), respectively.

Within a period within which the transistor Q4 is on, constant current produced by the transistor Q2 drives the semiconductor laser 116.

By the configuration described above, laser driving current DI specified by the laser power controlling signal SLPC is supplied to the semiconductor laser 116 at a timing in accordance with the inputted light emission timing signal SLT.

As a result, such a light waveform as shown in FIG. 4B is generated.

As described hereinabove, all of the laser power controlling signal SLPC for controlling the laser driving current, pulse width controlling signal PWDC for controlling the pulse width of the light emission timing signal SLT and a delay amount controlling signal SLYC for controlling the delay amount of the recording clock are generated by the servo signal processing section 141.

The control signals mentioned are generated based on the linear velocity and the channel clock frequency from the address information included in the servo data by the servo signal processing section 141 of the system controller 140.

By the configuration described above, the semiconductor laser can be driven to emit light with an optimum phase, an optimum pulse width and optimum light power in accordance with the linear velocity and the channel clock frequency.

<3. Control with Respect to Linear Velocity Variation>

In the following, control against linear velocity variation is described as an example of particular control.

FIGS. 10A to 10D illustrate laser driving current control against linear velocity variation in the present embodiment.

FIG. 10A illustrates the optical power of a light spot, the temperature distribution on the medium and a manner of a formed magnetic domain at a certain linear velocity. The axis of abscissa indicates not the time but the position of the medium.

The light spot raises the temperature of the medium when it is irradiated upon the medium for a constant period of time as seen from FIG. 4B. Since the disk is rotating also during irradiation of the light spot, the light spot is irradiated over a range greater than the size thereof.

Further, the heat applied to the medium by the light spot diffuses also in a planar direction of the medium.

As a result, the temperature distribution on the medium is greater than the range within which the light spot is irradiated as seen in FIG. 10A.

It is to be noted that reference character To in FIG. 10A indicates a temperature at which the coercive force of the medium drops by a rise of the temperature of the medium until it becomes lower than the recording magnetic field. In a region of the temperature distribution within which the temperature exceeds the temperature To, a magnetic domain is formed in accordance with the recording magnetic field.

FIGS. 10B to 10D illustrate the optical power, temperature distribution and manner illustrated in FIG. 10A but where the linear velocity is higher than that in the case of FIG. 10A.

In particular, FIG. 10B illustrates the optical power, temperature distribution and manner where a light spot is irradiated with the same waveform as that in the case of FIG. 10A.

When the linear velocity is high, the light spot is irradiated over a wider range on the medium while the period of time within which the light spot is irradiated per unit area becomes shorter. As a result, the temperature distribution occurs over an expanded range and the maximum temperature becomes lower.

In FIG. 10B, the maximum temperature does not exceed the temperature To. Consequently, the coercive force of the magnetic medium does not become lower than the recording magnetic field, and therefore, a magnetic domain in accordance with the recording magnetic field is not formed.

Therefore, in order to raise the maximum temperature on the medium, the optical power is raised. The optical power, temperature distribution and manner in this instance are illustrated in FIG. 10C.

If the optical power is raised, then the maximum temperature on the medium becomes higher until a region within which the temperature is higher than the level To can be formed.

However, since the temperature distribution remains in the expanded state, also the region within which the temperature is higher than the level To remains in the expanded state. Therefore, an excessively greater magnetic domain is formed if it is assumed that the magnetic domain formed in the example of FIG. 10A has an appropriate size.

If such an excessively great magnetic domain is formed, then the transition point of the magnetic domain recorded successively is displaced thereby to make a cause of a data error. Further, since the region within which the temperature To is exceeded increases also in the track direction, the possibility that a recoded magnetic domain in an adjacent track may be varied increases.

Further, in order to suppress the expansion of the temperature distribution on the medium, the pulse width for the light spot is decreased. The optical power, temperature distribution and manner in this instance are illustrated in FIG. 10D.

If the temporal pulse width of the light spot is decreased, then also the range over which the light spot on the medium is irradiated decreases. Consequently, also the range of the temperature distribution on the medium can be narrowed.

Since also the range within which the temperature To is exceeded can be narrowed, also where the linear velocity is high, a magnetic domain of an appropriate size similar to that in the case of FIG. 10A can be formed.

Figure 11:
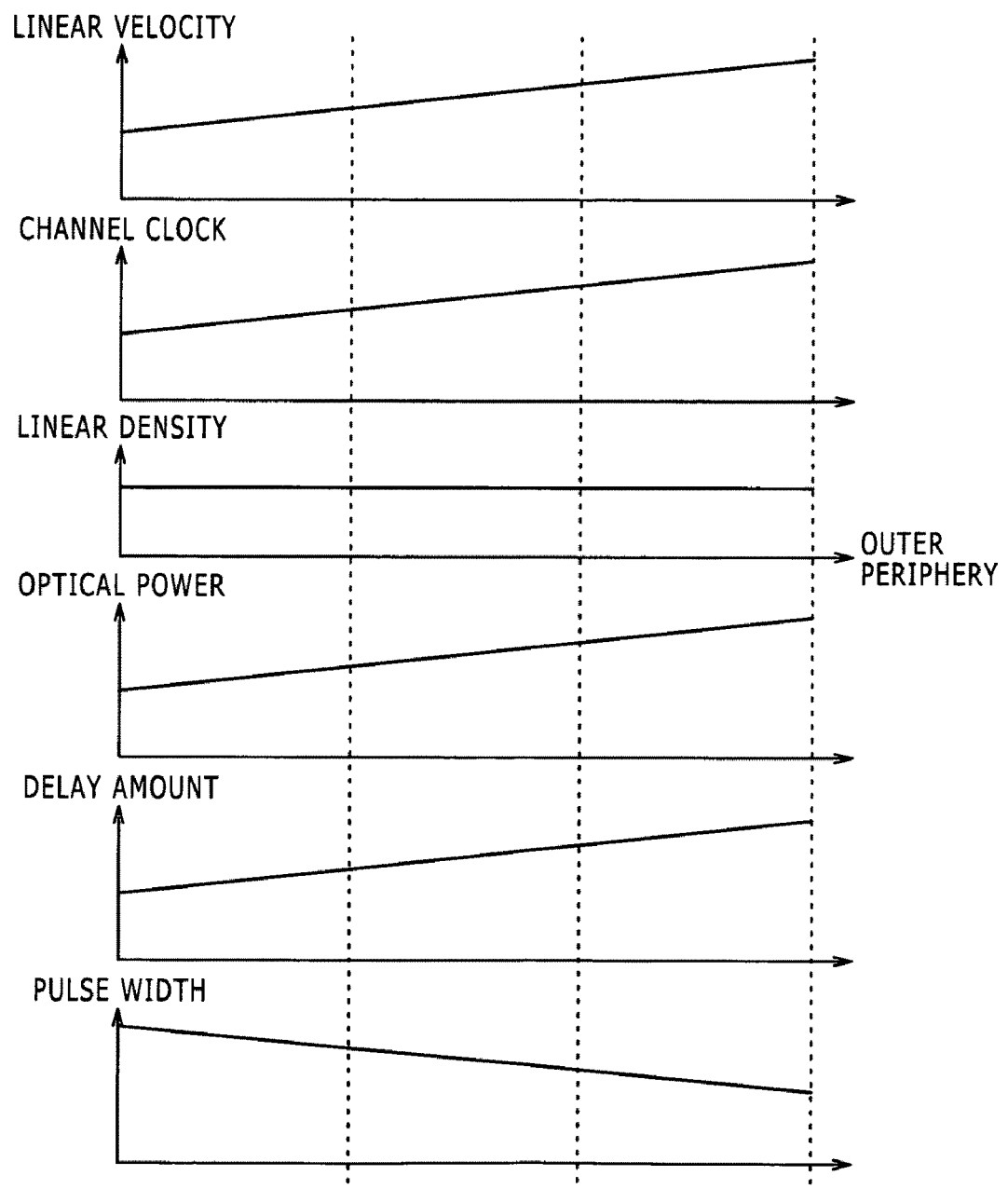
FIG. 11 is a diagrammatic view illustrating a controlling method for a light spot waveform in the thermally assisted hard disk apparatus of FIG. 5.

FIG. 11 illustrates a controlling method for the light spot waveform with the above-described behavior taken into consideration.

In response to a rise of the linear velocity, not only the optical power is raised but also the delay amount for the recording magnetic field is increased and the pulse width is decreased.

Figure 12A:
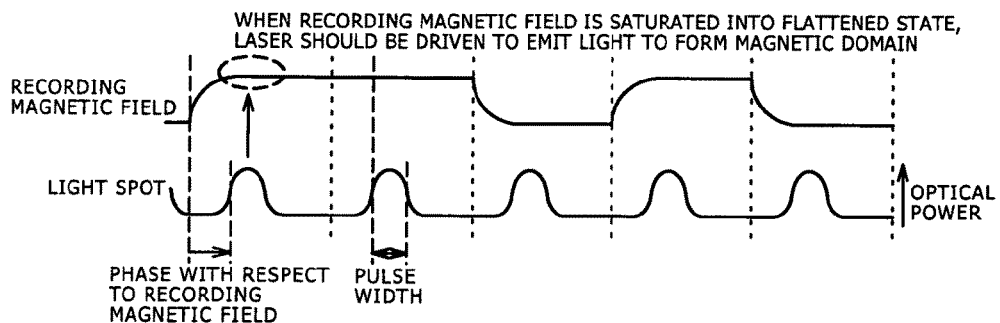
FIGS. 12A and 12B are timing charts illustrating different light spot waveforms with respect to a time axis in the thermally assisted hard disk apparatus of FIG. 5.
Figure 12B:
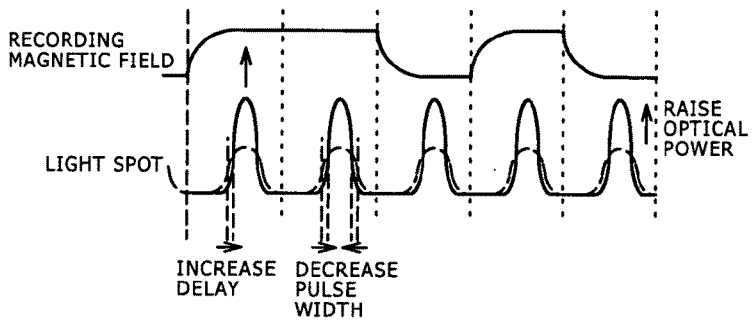

While the waveform of the light spot with respect to the position on the medium is shown in FIGS. 10A to 10D, light spot waveforms with respect to the time axis are illustrated in FIGS. 12A and 12B.

FIG. 12A corresponds to FIG. 10A and shows waveforms of the recording magnetic field and the light spot at a certain linear velocity.

Generally, it is considered that a good recording characteristic is obtained by irradiating the light spot when the recording magnetic field is saturated to enter a flattened state.

FIG. 12B corresponds to FIG. 10D. In this instance, such control of the light spot is carried out that, when the linear velocity is high, not only the light power is raised, but also the delay for the recording time is increased and the pulse width is decreased.

By controlling the light spot in this manner, good recording can be achieved also where the liner velocity is different.

As an actual problem of control of the waveform variation in response to the channel clock frequency variation, it cannot be avoided that, when the channel clock becomes such a high frequency as, for example, 1 GHz, the recording magnetic field waveform becomes blunted by the recording head and the band limitation.

Figure 13A:
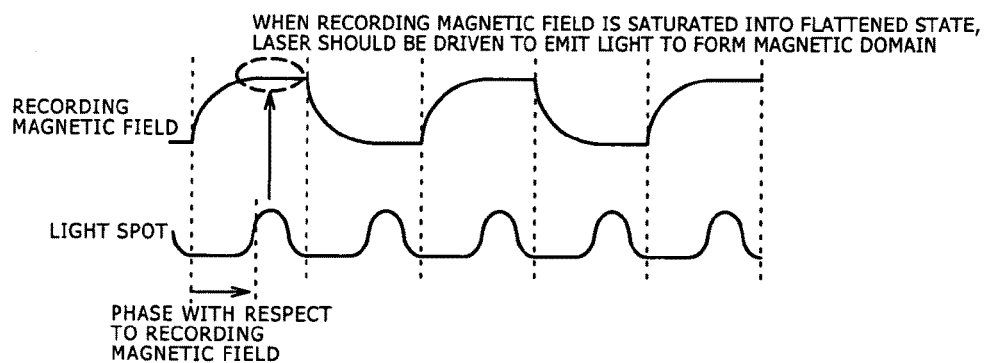
FIGS. 13A and 13B are timing charts illustrating different example of waveforms of a recording magnetic field and a light spot in a channel clock frequency in the thermally assisted hard disk apparatus of FIG. 5.

FIG. 13A shows an example of waveforms of the recording magnetic field and the light spot at a certain channel clock frequency.

The recording magnetic field has a response which becomes blunted at rising and falling edges thereof by band limitation of the write amplifier 115W and the recording head 113.

Where the recording magnetic field has such a waveform as just described, preferably a magnetic domain is formed by irradiating a light spot when the recording magnetic field is saturated to exhibit a flat state.

The phase or delay amount of the recording magnetic field is adjusted so that the light spot may be emitted at such a timing as just described.

Figure 13B:
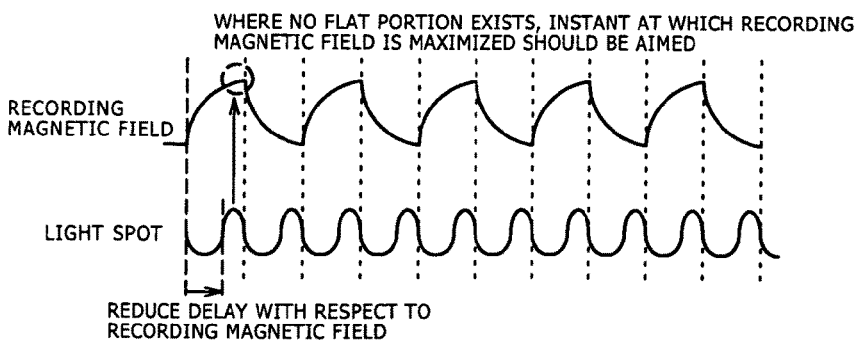

FIG. 13B shows an example of waveforms of the recording magnetic field and the light spot at a higher channel clock frequency. It can be seen that no flat portion exists from the recording magnetic field by limitation of the response speed of the recording magnetic field.

In such an instance, although the light spot cannot be emitted at a flat portion of the magnetic field, the light spot is preferably irradiated at an instant at which the recording magnetic field becomes as high as possible.

Accordingly, by controlling the light spot such that the delay thereof with respect to the recording magnetic field is reduced from that in the case of FIG. 12A, recording can be carried out also where the channel clock frequency is high.

Figure 14:
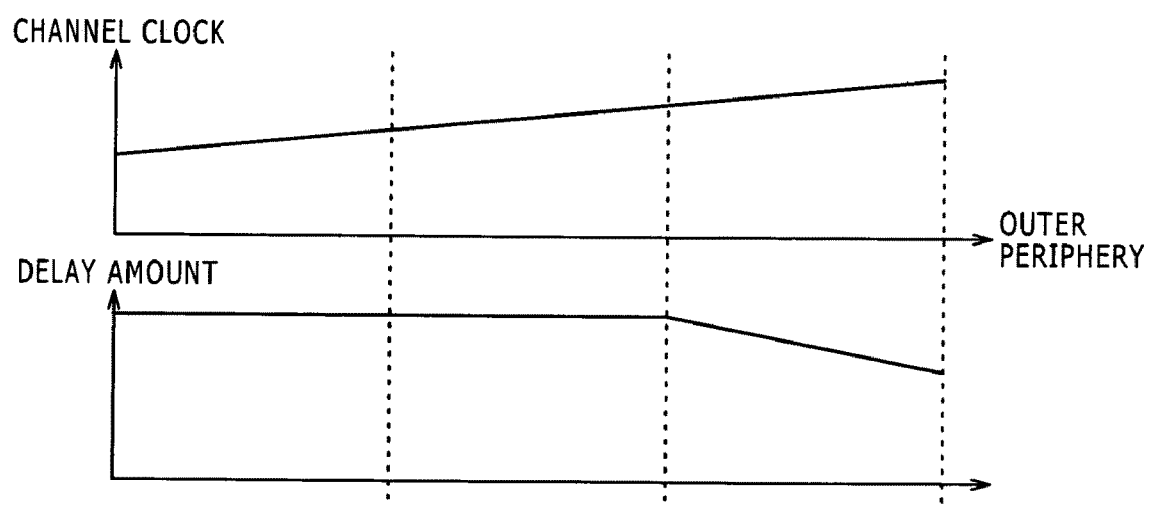
FIG. 14 is a diagrammatic view illustrating a different controlling method for a light spot waveform in the thermally assisted hard disk apparatus of FIG. 5.

FIG. 14 illustrates a controlling method for the light spot waveform with the above-described behavior taken into consideration.

In conformity with the loss of a flat portion of the recording magnetic field when the channel clock frequency becomes higher than a certain level, the delay amount of the light spot with respect to the recording magnetic field is reduced. By this, recording can be implemented also in a region in high channel clock frequency.

[Summary of Controlling Method of Light Spot]

Examples of control of the linear velocity and control of the channel clock frequency, that is, of the recording magnetic field waveform, have been described.

In FIGS. 11 and 14 which illustrate the controls described above, the controlling directions with respect to the channel clock frequency are opposite to each other.

By controlling with influences of them taken into consideration, a good recording characteristic can be obtained even under a variation of the liner velocity or the channel clock frequency.

As described above, according to the present embodiment, the hard disk apparatus 100 includes the magnetic recording medium 111 and the recording head 113 for recording information on the magnetic recording medium 111.

The hard disk apparatus 100 further includes the semiconductor laser 116 whose light emission is controlled in a recording clock period to irradiate a light spot on the magnetic recording medium 111 to carry out thermal assisting of magnetic recording.

The hard disk apparatus 100 further includes the laser driving circuit 117 for driving the semiconductor laser at a timing and with light power in accordance with the light emission timing signal and the laser power controlling signal, respectively, and the system controller 140.

The system controller 140 sets a laser power in response to at least one of the magnetic recording medium, semiconductor laser and recording head. Then, the system controller 140 outputs the laser power controlling signal to the laser driving circuit so that the laser power is varied adaptively in response to the linear velocity and the channel clock frequency.

Accordingly, the present embodiment is advantageous in that a good recording characteristic can be obtained even under a variation of the linear velocity or the channel clock frequency.

The present application contains subject matter related to that disclosed in Japanese Priority Patent Application JP 2009-224473 filed with the Japan Patent Office on Sep. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A hard disk apparatus, comprising:
   a magnetic recording medium;
   a recording head adapted to record information on said magnetic recording medium;
   a semiconductor laser adapted to be controlled for light emission in a cycle of a recording clock to irradiate a light spot upon said magnetic recording medium to carry out thermal assistance in magnetic recording by said recording head;
   a laser driving circuit adapted to drive said semiconductor laser at a timing and with optical power in accordance with a light emission timing signal and a laser power controlling signal; and
   a controller adapted to set laser power in accordance with at least one of characteristics of said magnetic recording medium, semiconductor laser and recording head and output the laser power controlling signal to said laser driving circuit so that the laser power is adaptively varied in accordance with at least one of a linear velocity and a channel clock frequency.

2. The hard disk apparatus according to claim 1, further comprising
   a variable delay circuit adapted to apply adjustable delay to a recording clock and output the resulting clock as the light emission timing signal to said laser driving circuit,
   said controller being operable to absorb a delay difference to said recording head and said semiconductor laser from the recording clock to adjust light emission timing with respect to a recording magnetic field and adaptively vary the light emission timing of said semiconductor laser in accordance with at least one of the linear velocity and the channel clock frequency.

3. The hard disk apparatus according to claim 1, further comprising
   a pulse generation circuit adapted to generate and output a pulse train synchronized with the recording clock to said laser driving circuit and capable of varying a pulse width in accordance with a pulse width controlling signal,
   said controller being operable to set the pulse width in accordance with at least one of characteristics of said magnetic recording medium, semiconductor laser and recording head and output the pulse width controlling signal to said pulse generation circuit so that a light emission pulse width is adaptively varied in accordance with at least one of the linear velocity and the channel clock frequency.

4. The hard disk apparatus according to claim 1, further comprising:
   a variable delay circuit adapted to apply adjustable delay to the recording clock in accordance with a delay amount controlling signal and output the resulting clock; and
   a pulse generation circuit adapted to generate a pulse train synchronized with the recording clock delayed by said variable delay circuit and output the resulting pulse train as a light emission timing signal to said laser driving circuit and capable of varying a pulse width in accordance with a pulse width controlling signal;

said controller being operable to absorb a delay difference to said recording head and said semiconductor laser from the recording clock to adjust a light emission timing for a recording magnetic field and adaptively vary the light emission timing of said semiconductor laser in accordance with at least one of the linear velocity and the channel clock frequency, said controller being operable to set the delay amount and the pulse width in accordance with at least one of characteristics of said magnetic recording medium, semiconductor laser and recording head and output the delay amount controlling signal to said variable delay circuit in accordance with at least one of the linear velocity and the channel clock frequency so that the delay amount is varied and besides output the delay amount controlling signal and the pulse width controlling signal to said pulse generation circuit so that the light emission pulse width is adaptively varied.

5. The hard disk apparatus according to claim 4, wherein said controller produces the laser power controlling signal for controlling the laser driving power, the pulse width controlling signal for controlling the pulse width of the light emission timing signal and the delay amount controlling signal for controlling the delay amount of the recording clock from address information included in servo data based on the linear velocity and the channel clock frequency.

6. The hard disk apparatus according to claim 4, wherein said controller produces the laser power controlling signal, delay amount controlling signal and pulse width controlling signal so that the light power raises and the delay amount with respect to the recording magnetic field increases but the pulse width decreases in response to increase of the linear velocity.

7. The hard disk apparatus according to claim 4, wherein said controller controls the delay amount so that the light spot is emitted at a timing at which the recording magnetic field is saturated.

8. The hard disk apparatus according to claim 4, wherein, where the channel clock frequency used does not cause saturation of the recording magnetic field, said controller controls the delay amount so that the delay with respect to the recording magnetic field decreases.

9. A driving method for a hard disk apparatus which includes a magnetic recording medium, a recording head adapted to record information on the magnetic recording medium, a semiconductor laser adapted to be controlled for light emission in a cycle of a recording clock to irradiate a light spot upon the magnetic recording medium to carry out thermal assistance in magnetic recording by the recording head, and a laser driving circuit adapted to drive the semiconductor laser at a timing and with optical power in accordance with a light emission timing signal and a laser power controlling signal, the driving method, comprising the step of:
    setting, when the semiconductor laser of the hard disk apparatus is driven, laser power in accordance with at least one of characteristics of the magnetic recording medium, semiconductor laser and recording head and adaptively varying the laser power in accordance with at least one of a linear velocity and a channel clock frequency.

10. The driving method for a hard disk apparatus according to claim 9, wherein a delay difference to the recording head and the semiconductor laser from the recording clock is absorbed to adjust the light emission timing with respect to the recording magnetic field and the light emission timing of the semiconductor laser is adaptively varied in accordance with at least one of the linear velocity and the channel clock frequency.

11. The driving method for a hard disk apparatus according to claim 9, wherein the pulse width is set in accordance with at least one of characteristics of the magnetic recording medium, semiconductor laser and recording head and the light emission pulse width is adaptively varied in accordance with at least one of the linear velocity and the channel clock frequency.

* * * * *